Patented May 19, 1936

2,040,861

UNITED STATES PATENT OFFICE 2,040,861

ANTHRAPYRIMIDINES AND THEIR PRODUCTION

Max Albert Kunz, Mannheim, and Karl Koeberle, Ludwigshafen-on-the-Rhine, Germany, assignors to General Aniline Works, Inc., New York, N. Y., a corporation of Delaware No Drawing. Application August 2, 1933, Serial No. 683,402. Renewed December 10, 1935. In Germany January 21, 1931

14 Claims. (Cl. 260—32)

The present invention relates to a new method of producing anthrapyrimidines, in particular acylaminoanthrapyrimidines, and products obtained by this method.

We have found that anthrapyrimidine corresponding to the formula:

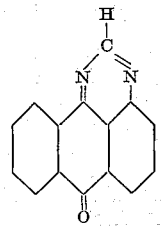

and substitution products thereof are obtained by condensing α-nitroanthraquinone or a substitution product thereof with formamide. The process is inter alia suitable for producing acylaminoanthrapyrimidines which are valuable vat dyestuffs, in particular those containing as acid radicle one of a cyclic carboxylic acid capable of being vatted, such as for example the carboxylic acids of anthraquinones, anthraquinone-thioxanthrones, thiazolanthrones, pyrazolanthrones, anthraquinone-benzacridones, benzathraquinones, anthrapyridones, anthrapyrimidones, anthrapyrimidines, pyridinoanthraquinones, pyranthrones, anthraquinone-oxazols, anthraquinonethiazols, and anthraquinone-imidazols which may be substituted by halogen, alkyl, amino or nitro groups. The process may also be employed with advantage for the production of anthrapyrimidine itself and its substitution products, for example its halogen, amino, nitro and alkyl substitution products.

The condensation is preferably carried out in inert organic solvents, such as phenol or nitrobenzene. Substances accelerating condensation are preferably added to the reaction mixture. Such substances are for example metals, such as copper, aluminium and iron, or oxides or salts of metals, for example salts of tungsten, molybdenum or vanadium. Ammonium vanadate has proved particularly suitable. The temperature at which condensation is effected, is preferably between about 100° and about 200° C.

The reaction products which are almost obtained in very good yields and in pure form may, if desired, be purified or separated from simultaneously formed isomers by conventional methods, for example by recrystallization from organic solvents, by way of their oxonium sulphates, sublimation or extraction with organic solvents of high boiling point. The preparation of acylamino-α-nitroanthraquinones by acylation of amino-α-nitroanthraquinones, and the condensation of the acylamino-α-nitroanthraquinones with formamide may be carried out in one operation without isolation of the intermediary product.

The aforesaid acylaminoanthrapyrimidines containing as acid radicle one of a cyclic carboxylic acid capable of being vatted may also be prepared by condensation of a corresponding acylaminoanthraquinone containing a further nitrogen atom in an alpha position and convertible into anthrapyrimidines with compounds capable of forming the pyrimidine ring, or by acylation of aminoanthrapyrimidines by means of cyclic carboxylic acids capable of being vatted, or their esters, anhydrides and in particular their acid chlorides.

The following examples will further illustrate the nature of this invention but the invention is not restricted to these examples. The parts are by weight.

Example 1

100 parts of 1-amino-4-nitroanthraquinone are mixed with 200 parts of phenol and heated at 180° to 185° C. after the addition of 200 parts of formamide and 10 parts of ammonium vanadate until a sample gives greenish yellow dyeings having a green fluorescence on acetate silk. This is usually the case after some hours. The reaction mixture is then allowed to cool and the reaction product precipitated in crystalline form is filtered off by suction. According to its qualities it is 4-amino-1,9-anthrapyrimidine.

The product may be purified in the following manner; 100 parts thereof are dissolved in 400 parts of concentrated sulphuric acid and the solution thus obtained is diluted without cooling until a concentration in sulphuric acid of 65 per cent is obtained. The reaction mixture is allowed to cool and the sulphate which has been precipitated is filtered off by suction and washed with 65 per cent sulphuric acid until the latter has a carmine red coloration. The residue is converted into the free 4-amino-1,9-anthrapyrimidine by heating to boiling with diluted ammonia or water for a short time, filtered off by suction and dried. The pure 4-amino-1,9-anthrapyrimidine thus obtained forms little yellow needles, dissolves in concentrated sulphuric acid giving a carmine red coloration and melts at 278° to 280° C. The purification may be effected also by recrystallization or sublimation.

Example 2

2 parts of ammonium vanadate are added to a mixture of 25 parts of 1-amino-5-nitroanthraquinone, 50 parts of formamide and 50 parts of nitrobenzene. The mixture is heated at 180° C. to 185° C. while stirring until a sample of the reaction product dissolved in sulphuric acid changes no longer in color when formaldehyde is added. The reaction mixture is allowed to cool and the precipitate formed is filtered off by suction and washed with alcohol and hot water. The reaction product obtained in good yield is a brown powder melting at about 345° C. after having been once recrystallized from trichlorbenzene. It dissolves in concentrated sulphuric acid giving a yellow coloration which changes into green upon the addition of some water. According to its qualities and the analysis the reaction product is 1,9,5,10-anthradipyrimidine; it is identical with the product which may be obtained by heating 1 part of 1,5-diaminoanthraquinone with 2 parts of formamide.

1,9,5,10-anthradipyrimidine is also obtained when 1,5-dinitroanthraquinone is treated with formamide.

Example 3

50 parts of 1-nitro-8-chloranthraquinone, 100 parts of formamide, 100 parts of nitrobenzene and 3 parts of ammonium vanadate are heated at 190° to 195° C. while stirring until no unchanged initial material can be identified in a sample. Then the reaction mixture is allowed to cool and the precipitate formed is filtered off by suction, washed with alcohol and hot water and dried. The dark brown reaction product is purified by recrystallization from trichlorbenzene in which it dissolves giving a red coloration with a green fluorescence. After this purification the reaction product is a bright brown substance crystallizing in needles having the melting point of 230° C. The product is identical with that obtainable from 1-amino-8-chloranthraquinone by heating with formamide, namely 8-chlor-1,9-anthrapyrimidine. By treating the reaction product with paratoluenesulphamide 8-amino-1,9-anthrapyrimidine melting at 276° C. is obtained from the said material.

In a similar manner 1-nitro-6-chlor and 1-nitro-7-chlor-anthraquinone may be converted into the corresponding anthrapyrimidine derivatives by treatment with formamide.

Example 4

20 parts of 1-nitroanthraquinone, 40 parts of formamide, 40 parts of nitrobenzene and 2 parts of iron powder are heated at 185° to 190° C. while stirring until unchanged initial material can no longer be detected in a sample. After working up the reaction mixture in the usual manner the reaction mixture is obtained in the form of a brown powder which may be purified by recrystallization, for example from trichlorbenzene. According to its qualities the product is identical with 1,9-anthrapyrimidine obtainable by heating 1-aminoanthraquinone with formamide.

Example 5

134 parts of 1-amino-4-nitroanthraquinone, 400 parts of nitrobenzene and 100 parts of parachlorbenzoylchloride are heated at 120° to 125° C. while stirring until the acylation is complete. Then dry ammonia gas is introduced into the reaction mass, 10 parts of ammonium vanadate and 400 parts of formamide are added and the reaction mixture is heated for some hours up to 180° to 190° C. As soon as the sample dissolved in sulphuric acid and precipitated with water has an orange coloration (no longer violet) the reaction is completed. The reaction mixture is allowed to cool and the precipitate is filtered off by suction. The reaction product thus obtained is 4-para-chlorbenzoylamino-1,9-anthrapyrimidine. It may be purified according to the usual methods, for example by sublimation.

If 1 part of 1-nitro-4-para-chlorbenzoylaminoanthraquinone be heated with 2 parts of formamide in 2 parts of phenol in the presence of 0.15 part of iron the same reaction product is obtained.

Example 6

10 parts of 1-nitro-5-benzoylaminoanthraquinone are heated with 20 parts of formamide and 20 parts of nitrobenzene in the presence of 1 part of ammonium vanadate at 185° C. until unchanged initial material can no longer be detected in a sample. After working up in the usual manner the reaction product is obtained in the form of a golden yellow crystal powder which may be further purified by recrystallization, if desired. It is identical with the product obtainable by benzoylating 5-amino-1,9-anthrapyrimidine and therefore is 5-benzoylamino-1,9-anthrapyrimidine; it dyes cotton from a red vat reddish yellow shades.

If instead of 1-nitro-5-benzoylaminoanthraquinone other 1-nitro-5-acylaminoanthraquinones are employed the corresponding 5-acylamino-1,9-anthrapyrimidines are obtained; for example 1 - nitro - 5 - parachlorbenzoylaminoanthraquinone, 1 - nitro - 5 -(2,5 - dichlorbenzoyl - amino)-anthraquinone, 1-nitro-5-paramethoxybenzoylaminoanthraquinone, 1 - nitro - 5 - orthotoluylamino-anthraquinone and the like may be used as initial materials.

Example 7

A mixture of 10 parts of 1-nitro-8-benzoylaminoanthraquinone, 20 parts of formamide, 20 parts of nitrobenzene and 1 part of ammmonium vanadate is heated at 185° to 190° C. while stirring until unchanged initial material can no longer be detected in a sample. After working up the reaction mixture an orange colored dyestuff powder is obtained which may be purified, if desired, by recrystallization or by treatment with alkali hypochlorite. It dissolves in concentrated sulphuric acid giving a yellow coloration and dyeing cotton from a bluish-red vat a yellow shade. By saponifying the reaction product 8-amino-1,9-anthrapyrimidine is obtained.

In a similar manner by treating other 1-nitro-8-acylaminoanthraquinones with formamide the corresponding 8 - acylamino - 1,9 - anthrapyrimidines may be prepared.

Example 8

100 parts of the acylamine prepared by condensation of 1-amino-4-nitroanthraquinone with 1,2(S)-1',2'(S)-anthraquinone-thioxanthone-3'-carboxylic acid chloride which latter compound corresponds to the formula:

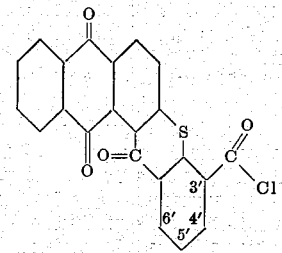

are heated to boiling in 300 parts of phenol with 300 parts of formamide after the addition of 2 parts of ammonium vanadate until a sample dyes cotton strong, pure yellow shades. The reaction mixture is then allowed to cool and the 4 - anthraquinone-thioxanthone-carboxylamino-1,9-anthrapyrimidine formed filtered off. It is a yellow crystalline powder, dissolves in concentrated sulphuric acid giving a yellow solution, yields a dark violet vat and gives dyeings and prints on the vegetable and animal fibre of extraordinarily strong yellow shades.

The acylamine of 1-amino-4-nitroanthraquinone and anthraquinone-thioxanthone-4', 5' and 6'-carboxylic acids can be converted into the corresponding anthrapyrimidines in the same manner. These products give also yellow dyeings as do the acylamino-anthrapyrimidines prepared in the beforementioned manner which are derived from 1-amino-5-nitroanthraquinone and 1-amino-8-nitroanthraquinone.

Substitution products of the aforesaid acylamino-anthrapyrimidines are obtainable in the same manner, for example such as contain chlorine, bromine, an alkyl, nitro or amino group. Such substitution products also give yellow dyeings.

Yellow dyeings are also obtained by the acylamino-1,9-anthrapyrimidines obtained in the manner described above by the action of formamide on 1-nitro-4-(thiazolanthrone-2'-carboxylamino)-anthraquinone, and 1-nitro-4-(pyrazolanthrone-2'-carboxylamino)-anthraquinone.

The acylamino-1,9-anthrapyrimidines containing in the acylamino group the radicle of an anthraquinone-benzacridone carboxylic acid in which the acid group is in the Bz-ring, or of a corresponding anthraquinone - naphthacridone carboxylic acid, prepared in the described manner yield orange to brown dyeings.

The acylamino-1,9-anthrapyrimidines containing the radicle of a carboxylic acid of benzanthraquinone, anthrapyridone which may be substituted on the N-atom by an alkyl, for example a methyl group, anthrapyrimidone which may also be substituted on the N-atom by an alkyl group, anthrapyrimidine, pyridinoanthraquinone, anthraquinone-oxazol, anthraquinone-thiazol and anthraquinone-imidazol prepared in the manner described above by condensation of the corresponding acylaminoanthraquinones with formamide yield generally speaking yellow shades on cotton.

Example 9

65 parts of 2-amino-C-phenyl-1,9-anthrapyrimidine (obtainable from C-phenylanthraquinone-2,1-oxazole by treatment with ammonia), 1000 parts of nitrobenzene and 58 parts of anthraquinone-2-carboxylic acid chloride are heated to boiling for some hours while stirring until the reaction mixture, which is originally orange red, has become yellow, allowed to cool and the reaction product which separates in excellent yields in a crystalline form is filtered off by suction. It dissolves in concentrated sulphuric acid giving a golden yellow coloration and dyes cotton green yellow shades of good fastness from a brown vat.

The reaction product of anthraquinone-2-carboxylic acid chloride on amino-1,9,4,10-anthradipyrimidine (obtainable from 1,9,4,10-anthradipyrimidine (obtainable from 1,5-diaminoanthraquinone) by nitration by means of a mixture of nitric and sulphuric acids and reduction of the nitro compound) is also a yellow crystalline powder which dissolves in concentrated sulphuric acid giving an orange coloration.

2-anthraquinone-$\beta$-carboxylamino-1,9-anthrapyrimidine (obtainable from anthraquinone-2,1-oxazole by treatment with ammonia and conversion of the 2-amino-1,9-anthrapyrimidine formed with 2-anthraquinone carboxylic acid chloride) yield pale yellow dyeings on cotton from orange brown vats.

Example 10

25 parts of 5-amino-1,9-anthrapyrimidine are heated to boiling for a short time in 500 parts of nitrobenzene with 30 parts of anthraquinone-2-carboxylic acid chloride. The reaction product worked up in the usual manner is a yellow crystalline powder dissolving in concentrated sulphuric acid to give a red solution and dyes cotton clear yellow shades from a brown red vat.

A product dyeing more greenish yellow shades is obtained by the use of 1-chloranthraquinone-2-carboxylic acid chloride instead of anthraquinone-2-carboxylic acid chloride, whereas the acylamino compound produced by means of 1-amino-anthraquinone-2-carboxylic acid chloride dyes clear strong red brown shades.

Example 11

26.2 parts of 2-amino-C-methyl-1,9-anthrapyrimidine (obtained by heating anthraquinone-C-methyl-2,1-oxazol with ammonia) are heated to boiling for a short time in 200 parts of nitrobenzene with 30 parts of anthraquinone-2-carboxylic acid chloride. After completion of the reaction which may be recognized by the evolution of hydrogen chloride ceasing, the reaction mixture is worked up as usual. The acylamine obtained in yellow needles dissolves in concentrated sulphuric acid to give a yellow solution and dyes the vegetable fibre yellow shades from a violet brown vat.

The 2-benzoylamino-C-methyl-1,9-anthrapyrimidine as well as the C-ethyl and the C-propyl derivative likewise dye yellow shades.

Example 12

18 parts of (1'-benzene-4'-carboxylic acid chloride)-1-aminoanthraquinone (obtainable by condensation of 1-chloranthraquinone with para-aminobenzoic acid and treating the product with thionyl chloride) are heated to boiling for a short time in 500 parts of nitrobenzene after the addition of 12 parts of 4-amino-1,9-anthrapyrimidine and allowed to cool after the evolution of hydrogen chloride has ceased. The reaction product recovered in the usual manner dissolves in concentrated sulphuric acid to give a yellow solution and dyes cotton red orange shades of good fastness from a brown violet vat. Instead of para-aminobenzoic acid other carboxylic acids of aromatic amines may be used for the preparation of the acylating component such as aminoanthraquinone carboxylic acids or pyrimidinoanthraquinone carboxylic acids.

The present application is a continuation in part of our copending application Ser. No. 586,692, filed January 14th, 1932, for Acylamino derivatives of the anthrapyrimidine series.

What we claim is:—

1. The process of producing anthrapyrimidines which comprises causing formamide to react on an $\alpha$-nitroanthraquinone at a temperature above about 100° C.

2. The process of producing anthrapyrimidines which comprises causing formamide to react on an $\alpha$-nitroanthraquinone in an inert organic solvent at a temperature above about 100° C.

3. The process of producing anthrapyrimidines which comprises causing formamide to react on an α-nitroanthraquinone in an inert organic solvent in the presence of a metal salt capable of reacting as condensation catalyst, at a temperature above about 100° C.

4. The process of producing anthrapyrimidines which comprises causing formamide to react on an α-nitroanthraquinone in an inert organic solvent in the presence of ammonium vanadate at a temperature above about 100° C.

5. The process of producing anthrapyrimidines which comprises causing formamide to react at a temperature between about 100° C. and about 200° C. on an α-nitroanthraquinone.

6. The process of producing anthrapyrimidines which comprises causing formamide to react at a temperature between about 100° C. and about 200° C. on an α-nitroanthraquinone in an inert organic solvent.

7. The process of producing anthrapyrimidines which comprises causing formamide to react at a temperature between about 100° C. and about 200° C. on an α-nitroanthraquinone in an inert organic solvent in the presence of ammonium vanadate.

8. The process of producing anthrapyrimidines which comprises causing formamide to react on an α-nitro-acylamino-anthraquinone in an inert organic solvent in the presence of ammonium vanadate at a temperature above about 100° C.

9. The process or producing anthrapyrimidines which comprises causing formamide to react on an α-nitroanthraquinone substituted by a group —NH—COX in which X stands for the radicle of a cyclic compound capable of being vatted and containing at least one anthrone group at a temperature above 100° C.

10. The process of producing anthrapyrimidines which comprises causing formamide to react on an α-nitroanthraquinone substituted by a group —NH—COX in which X stands for the radicle of a cyclic compound capable of being vatted and containing at least one anthrone group in an inert organic solvent at a temperature above about 100° C.

11. The process of producing anthrapyrimidines which comprises causing formamide to react on an α-nitroanthraquinone substituted by a group —NH—COX in which X stands for the radicle of a cyclic compound capable of being vatted and containing at least one anthrone group in an inert organic solvent in the presence of ammonium vanadate at a temperature above about 100° C.

12. The process of producing anthrapyrimidines which comprises causing formamide to react on an α-nitroanthraquinone substituted by a group —NH—COX in which X stands for the radicle of anthraquinone-thioxanthone in an inert organic solvent in the presence of ammonium vanadate at a temperature above about 100° C.

13. Anthrapyrimidines substituted by a group —NH—COX wherein X stands for the radicle of anthraquinone-thioxanthone, dyeing cotton very strong yellow shades.

14. The acylaminoanthrapyrimidine corresponding to the formula:

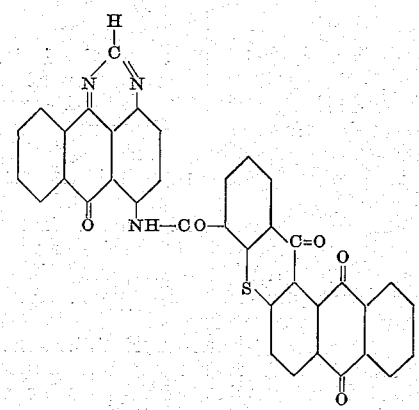

forming a yellow powder dissolving in concentrated sulphuric acid to give a yellow solution, which yields a dark violet vat and dyes the vegetable and animal fibre very strong yellow shades.

MAX ALBERT KUNZ.
KARL KOEBERLE.